(12) United States Patent
Hong et al.

(10) Patent No.: US 8,491,682 B2
(45) Date of Patent: Jul. 23, 2013

(54) ABRASIVE PARTICLES, METHOD OF MANUFACTURING THE ABRASIVE PARTICLES, AND METHOD OF MANUFACTURING CHEMICAL MECHANICAL POLISHING SLURRY

(75) Inventors: Suk Min Hong, Gyeonggi-do (KR);
Myung Won Suh, Gyeonggi-do (KR);
Yong Kuk Kim, Gyeonggi-do (KR);
Joon Ha Hwang, Gyeonggi-do (KR);
Jeong Yun Kim, Seoul (KR); Dong Hyun Kim, Seoul (KR)

(73) Assignee: K.C. Tech Co., Ltd., Gyeonggi-Do (KR)

( * ) Notice: Subject to any disclaimer, the term of this patent is extended or adjusted under 35 U.S.C. 154(b) by 475 days.

(21) Appl. No.: 12/344,458

(22) Filed: Dec. 27, 2008

(65) Prior Publication Data

US 2009/0193721 A1 Aug. 6, 2009

(30) Foreign Application Priority Data

Dec. 31, 2007 (KR) .......................... 10-2007-0141756
Dec. 31, 2007 (KR) .......................... 10-2007-0141758

(51) Int. Cl.
*B24D 3/02* (2006.01)
*C01F 17/00* (2006.01)

(52) U.S. Cl.
USPC ................. 51/307; 51/308; 51/309; 423/263; 423/325

(58) Field of Classification Search
USPC ................. 51/307, 308, 309; 423/263, 325
See application file for complete search history.

(56) References Cited

U.S. PATENT DOCUMENTS

| | | | | |
|---|---|---|---|---|
| 5,697,992 A | * | 12/1997 | Ueda et al. ...................... | 51/307 |
| 5,804,513 A | * | 9/1998 | Sakatani et al. ............. | 438/693 |
| 6,258,137 B1 | * | 7/2001 | Garg et al. ...................... | 51/298 |
| 2006/0013752 A1 | * | 1/2006 | Lee et al. ...................... | 423/263 |
| 2006/0156635 A1 | * | 7/2006 | Kim et al. ...................... | 51/309 |
| 2007/0240366 A1 | * | 10/2007 | Ota et al. ........................ | 51/298 |

* cited by examiner

*Primary Examiner* — Elizabeth Wood
(74) *Attorney, Agent, or Firm* — Marger, Johnson & McCollom, P.C.

(57) ABSTRACT

Disclosed are abrasive particles, a method for manufacturing the abrasive particles, and a method for manufacturing a Chemical Mechanical Polishing (CMP) slurry. The method for manufacturing abrasive particles for the CMP slurry includes preparing a raw material precursor, drying the raw material precursor, and calcining the dried raw material precursor using a calcination furnace where a gas atmosphere having relatively less oxygen in comparison with an air atmosphere is created.

13 Claims, 8 Drawing Sheets

ABRASIVE PARTICLES, METHOD OF MANUFACTURING THE ABRASIVE PARTICLES, AND METHOD OF MANUFACTURING CHEMICAL MECHANICAL POLISHING SLURRY

CROSS-REFERENCE TO RELATED APPLICATIONS

This application claims the benefit of Korean Patent Application Nos. 10-2007-0141758, filed on Dec. 31, 2007, and 10-2007-0141756, filed on Dec. 31, 2007 in the Korean Intellectual Property Office, the disclosures of which are incorporated herein by reference.

FIELD OF THE INVENTION

The present invention relates to manufacturing an abrasive slurry, and more particularly, to abrasive particles used in a Chemical Mechanical Polishing (CMP) process when manufacturing an ultrahigh integrated semiconductor, a method for manufacturing the abrasive particles, and a method for manufacturing a CMP slurry.

BACKGROUND OF THE INVENTION

A Chemical Mechanical Polishing (CMP) technique may be a technique for planarizing a surface of a predetermined film, that is, an object to be polished, formed on a silicon substrate used when manufacturing an ultrahigh integrated semiconductor. In a CMP process, a slurry including abrasive particles such as silica, alumina, ceria, and the like, a deionized water, a pH stabilizer, a surfactant, and the like may be used. As most important factors in the CMP process, a polishing speed, quality of a polishing surface, that is, an occurrence rate of micro-scratch on the polishing surface may be given. These two factors may rely greatly on a degree of dispersion of the abrasive particles, characteristics of the polishing surface, crystallinity of the abrasive particles, and the like.

When a size of the abrasive particles or a degree of crystallinity of the abrasive particles increases, the polishing speed increases, however, at the same time the occurrence rate of micro scratch on the polishing surface disadvantageously increases. Accordingly, in order to minimize the occurrence rate of micro scratch after polishing, the size of the abrasive particles and crystallinity of the abrasive particles may need to be optimized.

In addition, a ceria slurry using ceria as the abrasive particles may be widely used in comparison with other slurries due to its high etching selectivity of an oxide film with respect to a nitride film. The ceria included in the ceria slurry may be manufactured by a solid-phase synthesis method in which a raw material precursor is directly calcined and oxidized in the atmosphere. However, the ceria manufactured by the solid-phase synthesis method may have a high crystallinity and hardness, and thus occurrence of the micro scratch may be increased.

SUMMARY OF THE INVENTION

An aspect of the present invention provides abrasive particles that may minimize occurrence of micro scratch when a Chemical Mechanical Polishing (CMP) process of a silicon substrate used for manufacturing an ultrahigh integrated semiconductor by relaxing a crystallinity of the abrasive particles, and a method for manufacturing the abrasive particles.

Another aspect of the present invention also provides a method for manufacturing a CMP slurry including the abrasive particles.

According to an aspect of the present invention, there is provided a method for manufacturing abrasive particles for a Chemical Mechanical Polishing (CMP) slurry, the method including: preparing a raw material precursor; drying the raw material precursor; and calcining the dried raw material precursor using a calcination furnace where a gas atmosphere having relatively less oxygen in comparison with an air atmosphere is created.

According to another aspect of the present invention, there is provided a method for manufacturing a CMP slurry, the method including: preparing a raw material precursor, drying the raw material precursor, and calcining the dried raw material precursor using a calcination furnace where a gas atmosphere having relatively less oxygen in comparison with an air atmosphere is created to prepare abrasive particles; mixing the prepared abrasive particles, a solvent, and a dispersing agent to prepare a mixture for manufacturing a slurry; milling the mixture; filtering the milled mixture; and aging the filtered mixture after the filtered mixture is fed into an aging container.

In this instance, the method for manufacturing the CMP slurry may further include rotating the aging container after the aging.

According to another aspect of the present invention, there is provided abrasive particles for the CMP slurry manufactured according to claim 1, and in which a ratio of a main peak to a side peak on an XRD graph may be about 2 to 3.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
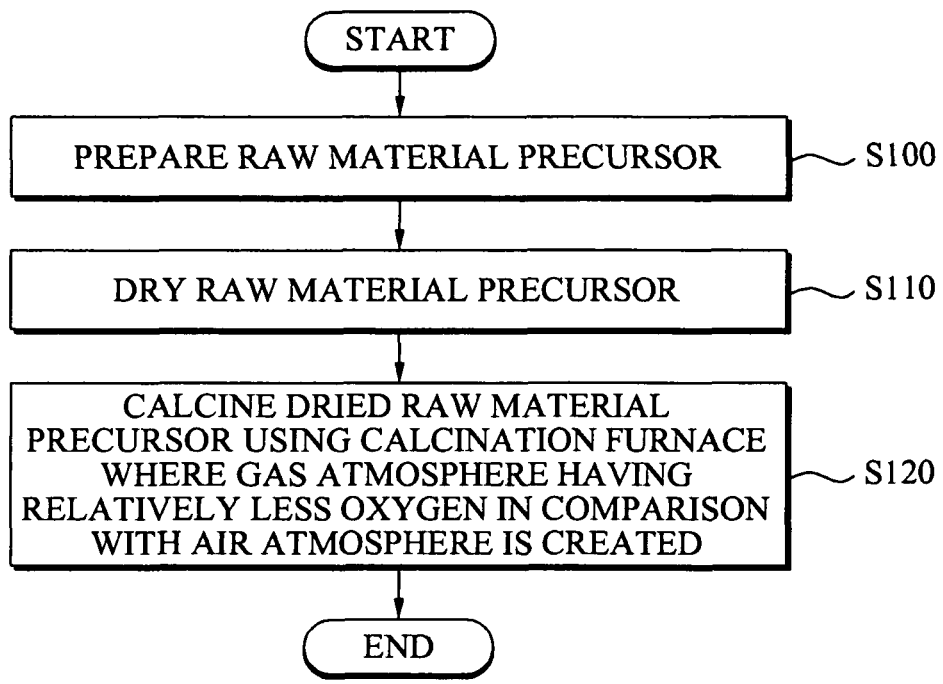
FIG. 1 is a flowchart illustrating a process for manufacturing abrasive particles for a Chemical Mechanical Polishing (CMP) slurry according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a flowchart illustrating a process for manufacturing abrasive particles for a Chemical Mechanical Polishing (CMP) slurry according to an embodiment of the present invention.

Referring to FIG. 1, the abrasive particles for the CMP slurry according to the present embodiment may be manufactured such that a raw material precursor is prepared in operation S100, the prepared raw material precursor is dried in operation S110, and the dried raw material precursor is calcined using a calcination furnace where a gas atmosphere having relatively less oxygen in comparison with an air atmosphere is created in operation S120. Here, the abrasive particles may be any one of silica particles, ceria particles, and alumina particles, however, the ceria particles, which will be described in detail below, may be used for the abrasive particles according to the present embodiment.

The ceria particles according to an embodiment of the invention may be manufactured by a solid-phase synthesis method using a raw material precursor. To manufacture the ceria particles, the raw material precursor may be prepared. As an example of the raw material precursor, a cerium carbonate may be used.

Next, adsorptive water absorbed in the raw material precursor may be vacuum dried. Because uneven temperature transmission inside the raw material precursor may occur due to evaporation of the adsorptive water in a case of calcining the raw material precursor not vacuum dried, the adsorptive water absorbed in the raw material precursor may be required to be removed by being vacuum dried before calcining the adsorptive water for the purpose of uniform particle growth.

A dry rate of the raw material precursor, that is, a rate of reduction in the weight of the raw material precursor before/after the drying may be about 20% or more, and preferably about 30% to 50%.

Next, the dried raw material precursor may be calcined while being moved, for example, at a speed of about 1,000 mm/hr or more. In this instance, crystallinity of the ceria particles may be relaxed, when the above-mentioned calcining process may advance under an atmosphere having relatively less oxygen in comparison with the air atmosphere. To relax the crystallinity of the ceria particles, a flow rate of oxygen entering the calcination furnace may be adjusted. For example, the oxygen may be supplied at the flow rate of about 10 liters per minute (LPM) to 20 LPM. Here, as the flow rate of the oxygen increases, a crystal-grain size and the crystallinity ratio may increase. When the flow rate of the oxygen exceeds about 20 LPM, a crystallinity ratio on an XRD graph defined as a ratio of a main peak to a side peak may increase, and thus generation of macro particles may increase. Also, when the flow rate of the oxygen is less than about 10 LPM, a minimum amount of the oxygen required for oxidation may be not supplied. As a result, when the flow rate of the oxygen is less than about 10 LPM, a color of ceria may be changed from light yellow to grey due to carbonate existing inside the cerium carbonate, and crystallinity of a cubic structure may be deteriorated. Thus, the flow rate of the oxygen may be adjusted to be within a range of about 10 LPM to 20 LPM for calcination. Therefore, a crystal growth occurring in a direction of a relatively high main peak 11 may be prevented due to effect of the oxygen, thereby controlling the particles to have a uniform shape.

The calcining process may be performed at a temperature of about 500° C. to 900° C. Here, a degree of crystallinity and the crystal-grain size may vary depending on the temperature. Specifically, as the temperature increases, the crystal-grain size or a size of a single crystal may increase.

As described above, according to an embodiment of the invention, the dried raw material precursor may be calcined under the gas atmosphere having relatively less oxygen in comparison with the air atmosphere after drying the raw material precursor, thereby manufacturing the ceria particles whose crystallinity is relaxed. In the manufactured ceria particles, a ratio of the main peak to the side peak on the XRD graph may be about 2 to 3.

Figure 2:
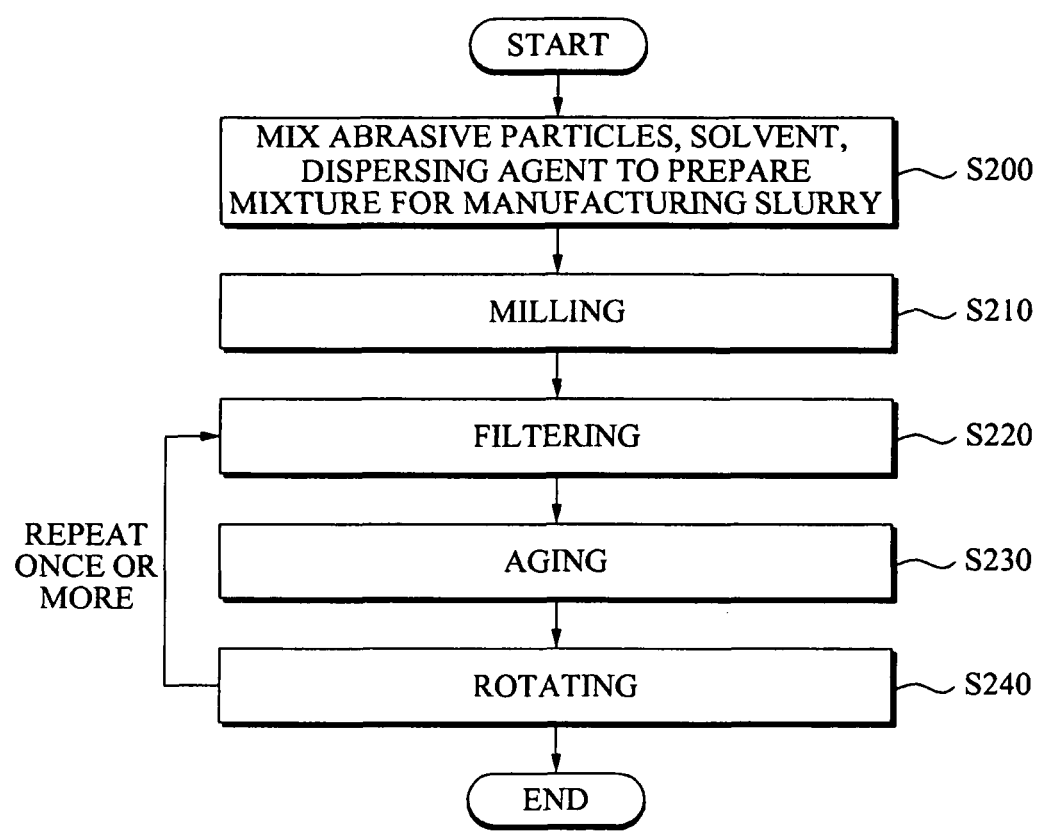
FIG. 2 is a flowchart illustrating a process for manufacturing a CMP slurry according to an embodiment of the present invention.

FIG. 2 is a flowchart illustrating a process for manufacturing a CMP slurry according to an embodiment of the present invention.

Referring to FIG. 2, the CMP slurry according to the present embodiment may be manufactured such that the abrasive particles manufactured as described above, a solvent, and a dispersing agent are mixed to prepare a mixture for manufacturing a slurry in operation S200, the prepared mixture is milled in operation S210, the milled mixture is filtered in operation S220, and the filtered mixture is fed into an aging container to age the mixture in operation 230. In addition, after the aging, the aging container is rotated in operation S240, as necessary. Hereinafter, a process for manufacturing the CMP slurry according to an embodiment of the invention, for example, a ceria slurry including ceria acting as the abrasive particles will be described in detail.

1. Prepare a Mixture of Abrasive Particles, Solvent, and Dispersing Agent

To manufacture the ceria slurry according to an embodiment of the invention, the ceria particles may be prepared such that a raw material precursor is prepared, the prepared raw material precursor is dried, and the dried raw material precursor is calcined using the calcination furnace where the gas atmosphere having relatively less oxygen in comparison with the air atmosphere is created.

Next, the manufactured ceria particles may be mixed with the solvent and dispersing agent to prepare a mixture for manufacturing the slurry. The ceria particles may have weak acidic characteristics when mixing with the solvent, for example, ultrapure water or distilled water. Condensation and precipitation of the ceria particles may be accelerated due to pH difference between the solvent and dispersing agent when the dispersing agent, for example, an anionic polymer dispersing agent, is added in the solvent mixed with the ceria particles. Accordingly, desirably, the ultrapure water and the anionic polymer dispersing agent are mixed to stabilize the solvent, and then the ceria particles may be mixed and wetted in the solvent. Specifically, the ultrapure water and anionic polymer dispersing agent are mixed in a high shear mixer for a predetermined period of time, and a desired amount of the ceria particles are added, mixed, and wetted therein, thereby preparing the mixture for manufacturing the slurry. Here, as the anionic polymer compound used as the dispersing agent, polymethacrylic acid, polyacrylic acid, ammonium polymethacrylate, ammonium polycarboxylate, carboxyl acrylic polymer, and the like may be used alone or any combination thereof.

2. Milling

The mixture for manufacturing the slurry manufactured as described above may be milled using a high energy milling machine to reduce a size of the abrasive particles. As the milling machine, a wet milling machine or a dry milling machine may be used. Because the dry milling machine may have a relatively low efficiency in particle pulverization in comparison with the wet milling machine, the milling may be preferably performed using the dry milling machine made of a ceramic material. In a case of the dry milling, due to condensation of the abrasive particles, a reduction of precipitation and milling efficiencies, a generation of macro particles, a large-area size distribution, and the like may occur. To prevent the above undesirable effects, an adjustment of size and packing rate of zirconia beads, adjustment of concentration of the abrasive particles, adjustment of pH and conductivity, and enhancement of distribution stability using the dispersing agent may be performed.

3. Filtering

The mixture for manufacturing the slurry milled as described above may be filtered using a filter effectively removing macro particles of about 1 μm or more to thereby selectively remove secondary uneven macro particles generated after the dry milling. The filtering may be performed for a predetermined period of time, for example, about two to four hours, however, the present invention is not limited thereto.

4. Aging

The mixture for manufacturing the slurry filtered as described above may be fed into an aging container, and the mixture may be aged to maintain networking between the ceria particles, thereby enhancing distribution stability, and stabilizing the mixture. The aging may be performed in the aging container for a predetermined period of time, for example, for about two or four hours, and then a slurry located on an upper layer portion or lower layer portion within the aging container may be removed.

5. Rotating

The aging container including the mixture for manufacturing the slurry aged as described above may be rotated with respect to a rotation axis outside of the aging container. In this instance, the rotating may be performed in a circular rotation, however the present invention is not limited thereto. For example, the rotating may be performed in an oval rotation, or along various other routes.

Macro particles of the ceria particles may be gathered on side walls of the aging container due to a rotation force generated by the rotation of the aging container, and located on the lower layer portion of the aging container due to gravity, and micro particles of the ceria particles may be located on the upper layer portion of the aging container. In this instance, by removing the macro particles located on the lower layer portion of the aging container, micro scratches of the ultrahigh integrated semiconductor when performing the CMP process may be reduced. The micro particles located on the upper layer portion of the aging container may be removed for stabilization of the slurry.

The rotation of the aging container may be performed at a speed of about 500 RPM to 20,000 RPM, and more preferably, at a speed of about 2,000 RPM to 5,000 RPM for about 5 to 15 minutes.

In addition, the filtering, the aging, and the rotating as described above may be performed once, respectively, however the present invention is not limited thereto. The filtering, the aging, and the rotating may be repeatedly performed at least once, and more preferably at least two times. In this instance, as a number of repeated performance in the filtering, the aging, and the rotating increases, the macro particles may be more effectively removed.

As described above, the CMP slurry according to an embodiment of the invention may include the ceria particles whose crystallinity is relaxed, and thus reducing generation of the micro scratch when performing the CMP process. Also, in the CMP slurry according to an embodiment of the invention, particles having about a 150% greater diameter or more with respect to an average diameter of all abrasive particles may be about 0.1% to 2% based on a number of all abrasive particles, and more preferably, about 0.5% to 1.5%. In the CMP slurry as described above, applications with respect to various patterns required when manufacturing the ultrahigh integrated semiconductor, and characteristics such as a polishing rate and polishing selectivity corresponding thereto may be improved.

Hereinafter, the present invention will be described in detail by examples. It is to be understood, however, that these examples are for illustrative purpose only, and are not construed to limit the scope of the present invention.

EXAMPLE 1

About 10 kg of a cerium carbonate was prepared, and the prepared cerium carbonate was dried so that a dry rate of the prepared cerium carbonate was about 30%. Next, the dried cerium carbonate was calcined in a rotational calcination furnace to prepare ceria particles. In this instance, the calcining was performed at a temperature about 700° C., and at a speed of about 1,000 mm/hr, and at a flow rate of oxygen was about 20 LPM.

EXAMPLE 2

The ceria particles were manufactured in the same manner as that in Example 1, except the flow rate of oxygen was about 10 LPM.

COMPARATIVE EXAMPLE 1

The ceria particles were manufactured in the same manner as that in Example 1, except the flow rate of oxygen was about 40 LPM.

COMPARATIVE EXAMPLE 2

The ceria particles were manufactured in the same manner as that in Example 1, except the flow rate of oxygen was about 30 LPM.

COMPARATIVE EXAMPLE 3

The ceria particles were manufactured in the same manner as that in Example 1, except the flow rate of oxygen was about 5 LPM.

COMPARATIVE EXAMPLE 4

About 10 kg of a cerium carbonate was prepared, and the prepared cerium carbonate was dried so that a dry rate of the prepared cerium carbonate was about 15%. Next, the dried cerium carbonate was calcined in the rotational calcination furnace to prepare ceria particles. In this instance, the calcining was performed at a temperature about 700° C., and at a speed of about 1,000 mm/hr, and at a flow rate of oxygen was about 30 LPM.

COMPARATIVE EXAMPLE 5

The ceria particles were manufactured in the same manner as that in Comparative Example 4, except the flow rate of oxygen was about 20 LPM.

COMPARATIVE EXAMPLE 6

About 10 kg of a cerium carbonate was prepared, and the prepared cerium carbonate was calcined to manufacture ceria particles without drying the prepared cerium carbonate. In this instance, the calcining was performed at a temperature of about 700° C., and at a speed of about 1,000 mm/hr, and at the flow rate of oxygen of about 20 LPM.

Estimation of Ceria Particles

The ceria particles manufactured in Examples 1 and 2, and Comparative Examples 1 to 6 were analyzed using X-ray diffraction, and a crystal grain size and a ratio of crystallinity are shown in Table 1.

TABLE 1

|  | Dry rate of raw material precursor (%) | Flow rate of oxygen (LPM) | Crystal-grain size | Ratio of crystallinity (main peak/side peak) |
| --- | --- | --- | --- | --- |
| Example 1 | 30 | 20 | 35 | 2.4 |
| Example 2 | 30 | 10 | 32 | 2.9 |
| Comparative Example 1 | 30 | 40 | 40 | 4.0 |
| Comparative Example 2 | 30 | 30 | 39 | 3.7 |
| Comparative Example 3 | 30 | 5 | 28 | 1.5 |
| Comparative Example 4 | 15 | 30 | 38 | 3.8 |
| Comparative Example 5 | 15 | 20 | 37 | 3.3 |
| Comparative Example 6 | 0 | 20 | 39 | 3.6 |

Figure 3:
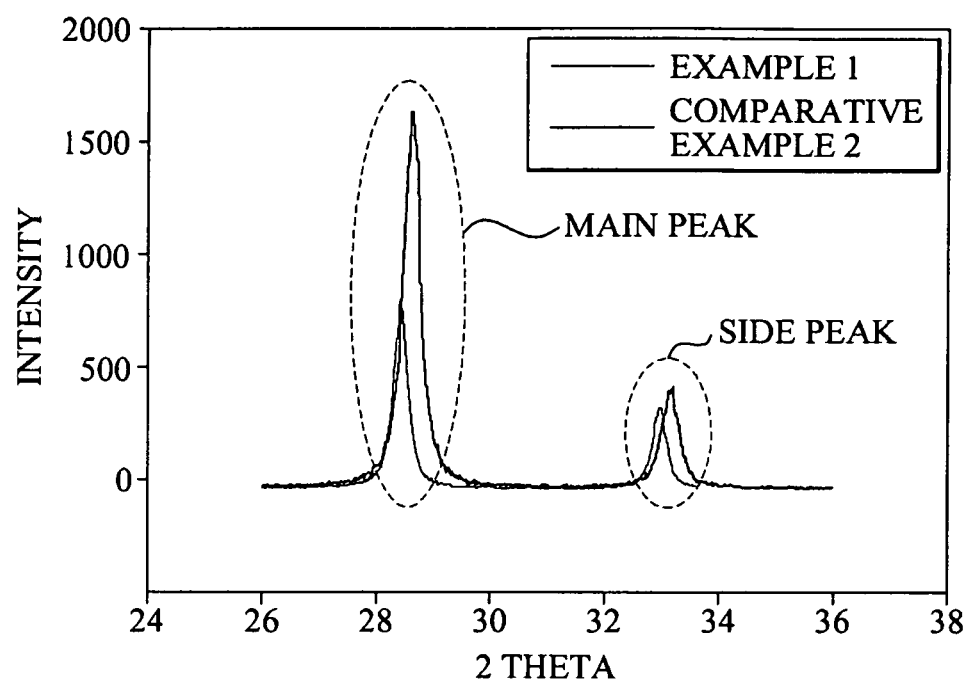
FIG. 3 is an XRD graph of ceria particles respectively manufactured according to Example 1 and Comparative Example 2 of the present invention.
Figure 4:
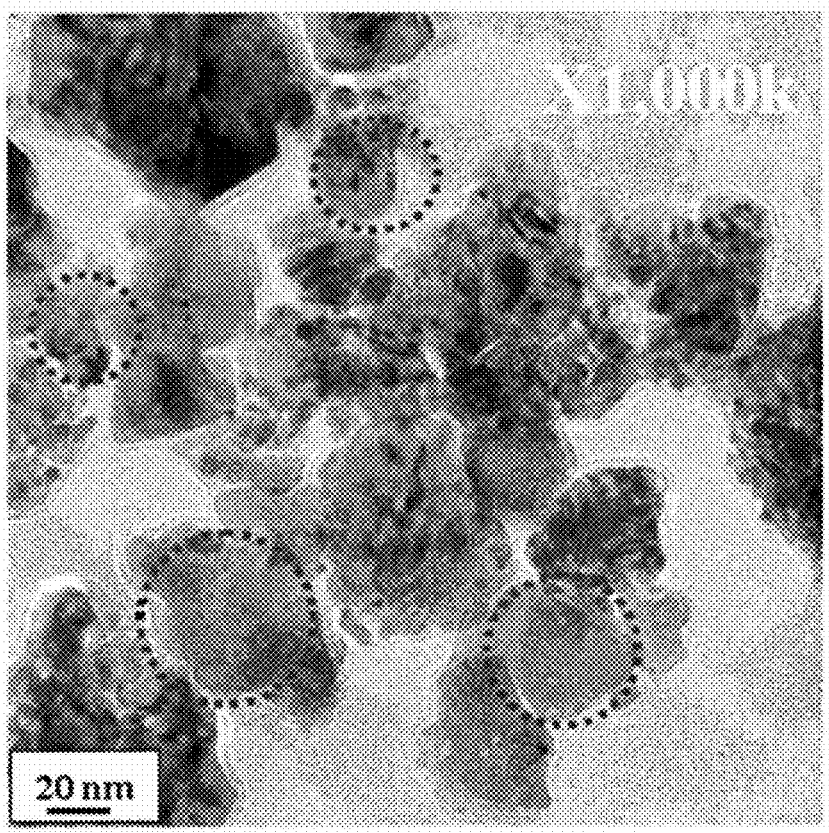
FIG. 4 is a Transmission Electron Microscopy (TEM) photograph of ceria particles manufactured according to Example 1 of the present invention.
Figure 5:
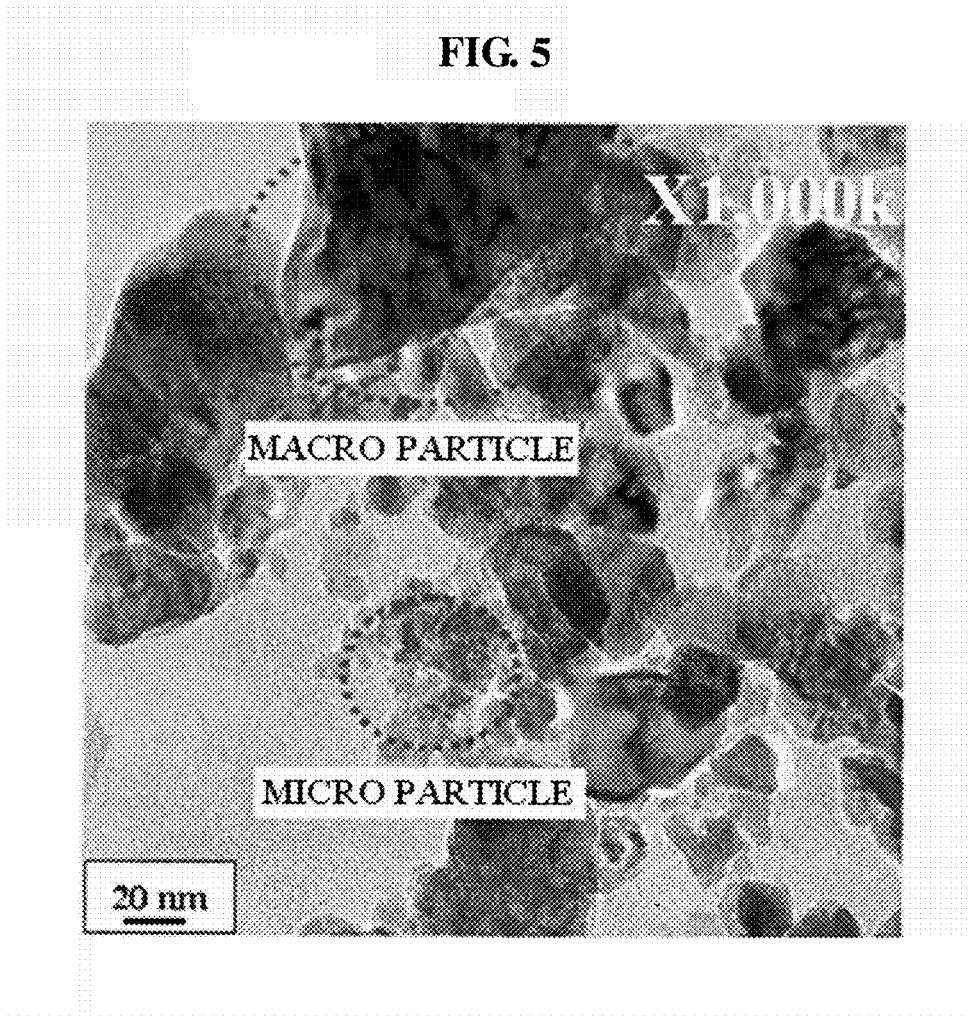
FIG. 5 is a TEM photograph of ceria particles manufactured according to Comparative Example 1 of the present invention.

As shown in Table 1, it can be found that the crystallinity in Examples 1 and 2 was relaxed since the flow rates of oxygen in Examples 1 and 2 were smaller than those in Comparative Examples 1 and 2. For example, as shown in FIG. 3, a main peak strength and side peak strength varied depending on the flow rate of oxygen despite having an identical dry rate of the raw material precursor. Also, in Example 1, particle growth was performed in a uniform manner as shown in FIG. 4, however in Comparative Example 1, generation of macro particles and micro particles were increased due to abnormal particle growth as shown in FIG. 5. Also, it can be found that the crystallinity in Examples 1 and 2 was relaxed since the dry rate of the raw material precursor in Examples 1 and 2 was greater than that in Comparative Examples 4 to 6. In addition, it can be found that the crystallinity in Comparative Example 3 was overly relaxed since an appropriate amount of oxygen was not supplied, and accordingly the crystal-grain size was significantly small. Also, the crystal-grain size increased along with an increase in the flow rate of oxygen.

Ceria Slurry Manufacturing

EXAMPLE 3

About 10 kg of the ceria particles manufactured through Example 1, about 90 kg of ultrapure water, and about 0.1 kg of ammonium poly methacrylate acting as an anionic polymer dispersing agent were mixed and wetted for about four hours, and then the mixed mixture of about 10 wt % was milled using a path type-milling method. Next, the milled mixture was filtered for about two hours, and then the filtered mixture was fed into an aging container and aged for about two hours to prepare a ceria slurry.

EXAMPLE 4

The ceria slurry was manufactured in the same manner as that in Example 3, except that the ceria particles manufactured through Example 2 was used.

EXAMPLE 5

The ceria slurry was manufactured in the same manner as that in Example 3, and then the aging container was rotated at a speed of about 3,000 RPM for about ten minutes after the aging to thereby remove micro particles located on an upper layer portion of the aging container.

EXAMPLE 6

The ceria slurry was manufactured in the same manner as that in Example 5, except that the filtering, the aging, and the rotating were performed two times.

EXAMPLE 7

The ceria slurry was manufactured in the same manner as that in Example 5, except that the filtering, the aging, and the rotating were performed three times.

COMPARATIVE EXAMPLE 7

The ceria slurry was manufactured in the same manner as that in Example 3, except that the ceria particles manufactured through Comparative Example 1 was used.

COMPARATIVE EXAMPLE 8

The ceria slurry was manufactured in the same manner as that in Example 3, except that the ceria particles manufactured through Comparative Example 2 was used.

COMPARATIVE EXAMPLE 9

The ceria slurry was manufactured in the same manner as that in Example 3, except that the ceria particles manufactured through Comparative Example 3 was used.

COMPARATIVE EXAMPLE 10

The ceria slurry was manufactured in the same manner as that in Example 3, except that the ceria particles manufactured through Comparative Example 4 was used.

COMPARATIVE EXAMPLE 11

The ceria slurry was manufactured in the same manner as that in Example 3, except that the ceria particles manufactured through Comparative Example 5 was used.

Performance of Ceria Slurry

Hereinafter, CMP characteristics such as a polishing speed of the slurry, a number of micro scratches, and the like will be described in detail. Measuring equipments used for various analyses are as below.

1) High resolution-Transmission Electron Microscope (TEM): CM200 of Philips
2) Particle size analyzer: LA-910 of Horiba in Japan
3) Particle analyzer: Accusizer F/X of ATI in the US As described above, a test for measuring CMP performance with respect to a to-be-polished material was performed using various slurries. In this instance, 6EC of Strasbaugh in the US was used as a CMP equipment, and a wafer in which an oxide layer was formed on a front surface of an 8 inch-wafer by coating a plasma enhanced chemical vapor deposition TEOS Oxide (PE-TEOS) and a wafer in which a nitride layer was formed on the front surface of the 8 inch-wafer by coating $Si_3N_4$ may be used as an object wafer, and conditions for the test were as below.
1) Pad: IC1000/SUBAIV (Rodel in the US)
2) Layer thickness measuring machine: Nano-Spec 180 of Nano-metrics in the US
3) Table speed: 70 rpm
4) Spindle speed: 70 rpm
5) Down force: 4 psi
6) Back pressure: 0 psi
7) Amount of supplied slurry: 100 ml/min
8) Measurement of residual particles and scratch: Surfscan SP1 of KLA Tencor in the US As described above, the front surface of the wafer where the oxide layer (PE-TEOS) and nitride layer ($Si_3N_4$) were formed was polished for about one minute using the ceria slurry manufactured under the above-mentioned conditions, and then a polishing speed was measured based on change in a thickness removed due to the polishing, and micro-scratch was also measured using Surfscan SP1. Polishing performance of each of the slurries was measured three times or more with respect to a blank wafer prepared as described above to thereby obtain results of polishing characteristics, and average results are shown in Table 2.

TABLE 2

| | Dry rate of cerium precursor (%) | Flow rate of oxygen (LPM) | Polishing speed of oxide layer (Å/min) | Polishing speed of nitride layer (Å/min) | Polishing Selectivity | Residual particles on the oxide layer | Micro-scratch (#) |
|---|---|---|---|---|---|---|---|
| Example 3 | 30 | 20 | 2206 | 60 | 37 | 36 | 1 |
| Example 4 | 30 | 10 | 2184 | 62 | 35 | 35 | 1 |
| Example 5 | 30 | 20 | 1570 | 62 | 25 | 40 | 2 |
| Example 6 | 30 | 20 | 1503 | 60 | 25 | 36 | 1 |
| Example 7 | 30 | 20 | 1185 | 59 | 20 | 26 | 0 |
| Comparative Example 7 | 30 | 40 | 2418 | 63 | 38 | 59 | 5 |
| Comparative Example 8 | 30 | 30 | 2332 | 63 | 37 | 42 | 4 |
| Comparative Example 9 | 30 | 5 | 1940 | 62 | 31 | 25 | 0 |
| Comparative Example 10 | 15 | 30 | 2384 | 63 | 38 | 46 | 2 |
| Comparative Example 11 | 15 | 20 | 2289 | 63 | 36 | 38 | 2 |

Referring to Table 2, Examples 3 to 7 showed a suitable range in view of the polishing speed of oxide layer, the polishing speed of nitride layer, the polishing selectivity, and residual particles on the oxide layer. In particular, relatively excellent micro-scratch characteristics were exhibited in Examples 3, 4, 6, and 7 in comparison with Comparative Examples 7, 8, 10, and 11. In Examples 5 to 7, as a number of the filtering process, the aging process, and the rotating process increased, the polishing speed of the nitride layer was insignificant, however, the polishing speed of the oxide layer was accordingly reduced.

Hereinafter, particle size distribution and dispersion stability estimations will be described in detail according to an additional process such as the rotation of the aging container.

Figure 6:
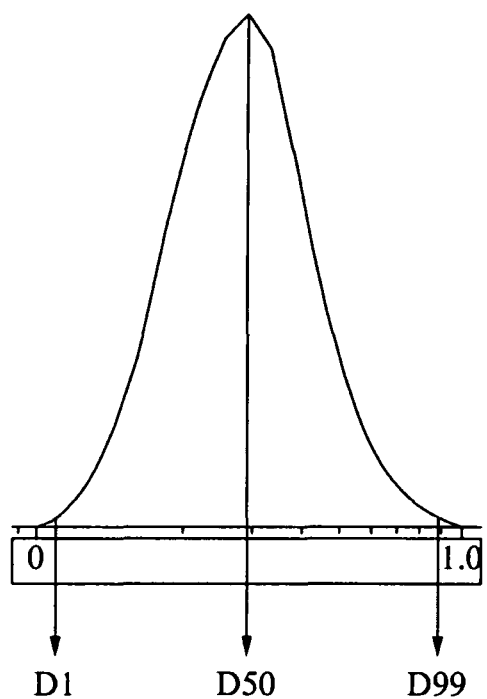
FIG. 6 is a schematic diagram illustrating definitions of D1, D50, and D99.

FIG. 6 is a schematic diagram illustrating definitions of D1, D50, and D99.

Referring to FIG. 6, D50 is a middle size corresponding to about 50% of an entire size distribution, D99 is a size corresponding to about 1% starting from a largest size, and D1 is a size corresponding to about 1% starting from a smallest size. Accordingly, a value of D99 may be a value indicating a size of a largest secondary particle, and the value of D99 may increase along with an increase in condensation and a deterioration in dispersion stability.

Table 3 below shows results obtained by measuring the particle size distribution of Examples 5 to 7.

TABLE 3

| | Frequency [filtering process, aging process, and rotating process] | D50 (nm) | D99 (nm) | Ratio based on particle size of 150% of D50 (%) |
|---|---|---|---|---|
| Example 5 | 1 | 118 | 188 | 1 |
| Example 6 | 2 | 108 | 163 | 1.1 |
| Example 7 | 3 | 92 | 131 | 0.5 |

Figure 7:
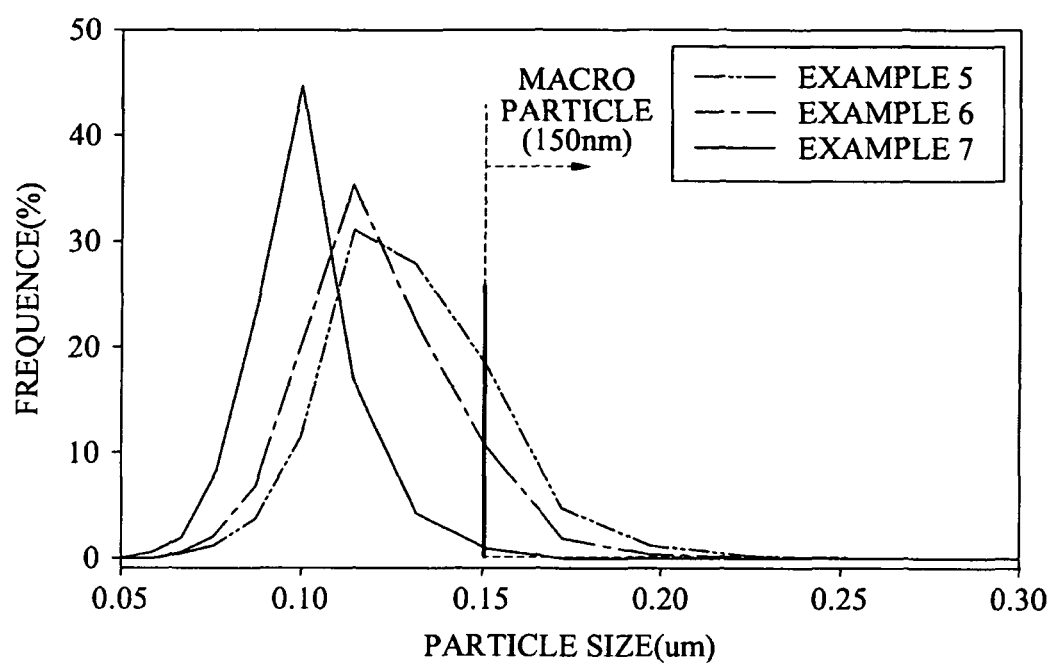
FIG. 7 is a diagram illustrating particle size distribution according to Example 5 to Example 7.
Figure 8:
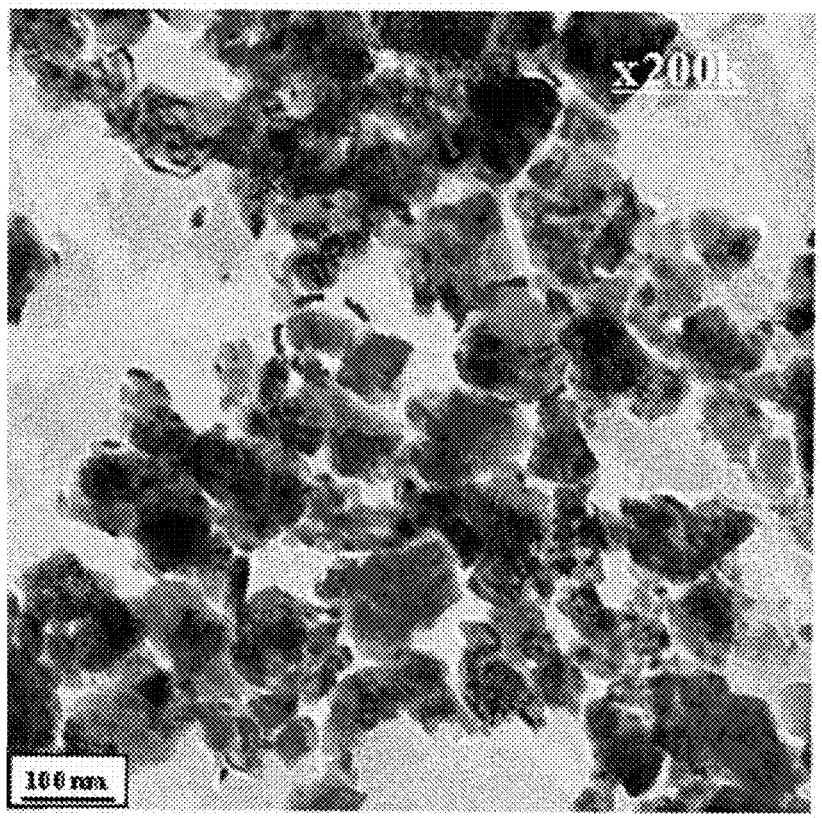
FIG. 8 is a TEM photograph of a ceria slurry manufactured according to Example 6.

Referring to Table 3 and FIG. 7, in Examples 5 to 7, D50, that is, an average particle size of the abrasive particles was significantly small, and was suitable for CMP process when manufacturing a semiconductor where a design rule is reduced since the average particle size was about 90 nm to 120 nm. Also, in Examples 5 to 7, macro particles were effectively removed. For example, as shown in FIG. 8, in a case of the ceria slurry of Example 6, the macro particles were effectively removed, and uniform particle size distribution was shown. Here, a number of repetitions of the filtering process, aging process, and rotating process increases, the average particle size was significantly small, and macro particles were significantly removed.

As described above, according to the present invention, a raw material precursor may be dried, and then the dried raw material precursor may be calcined under a gas atmosphere lacking oxygen in comparison with the atmosphere, whereby abrasive particles for a CMP slurry whose crystallinity is relaxed may be manufactured. As a result, generation of micro-scratch may be suppressed when performing the CMP process using a slurry including the abrasive particles according to the present invention. Also, macro particles may be effectively removed through an aging process and a process of rotating an aging container, and dispersion stability may be improved. Also, according to the present invention, the CMP slurry having superior physical properties with respect to various characteristics necessary for the CMP slurry may be manufactured. Accordingly, applications with respect to various patterns required in the process for manufacturing the ultrahigh integrated semiconductor, and characteristics such as a polishing rate and polishing selectivity corresponding thereto, and the like may be improved.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method for manufacturing abrasive particles for a Chemical Mechanical Polishing (CMP) slurry, the method comprising:
   preparing a raw material precursor;
   drying the raw material precursor;
   calcining the dried raw material precursor using a calcination furnace where a gas atmosphere having relatively less oxygen in comparison with an air atmosphere is created; and
   supplying oxygen to the furnace at a flow rate of approximately 10 liters per minute to approximately 20 liters per minute.

2. The method of claim 1, wherein a dry rate of the raw material precursor due to the drying is about 30% to 50%.

3. The method of claim 1, wherein the calcining is performed at a temperature of about 500° C. to 900° C.

4. The method of claim 1, wherein the raw material precursor includes a cerium carbonate.

5. A method for manufacturing a CMP slurry, the method comprising:
   preparing a raw material precursor, drying the raw material precursor, and calcining the dried raw material precursor using a calcination furnace where a gas atmosphere having relatively less oxygen in comparison with an air atmosphere is created to prepare abrasive particles while supplying oxygen to the furnace at a flow rate of approximately 10 liters per minute to approximately 20 liters per minute;
   mixing the prepared abrasive particles, a solvent, and a dispersing agent to prepare a mixture for manufacturing a slurry;
   milling the mixture;
   filtering the milled mixture; and
   aging the filtered mixture after the filtered mixture is fed into an aging container.

6. The method of claim 5, further comprising:
   rotating the aging container.

7. The method of claim 5, wherein the filtering is performed for about two to four hours.

8. The method of claim 5, wherein the aging is performed for about two to four hours.

9. The method of claim 6, wherein the aging container is rotated with respect to a rotation axis outside of the aging container.

10. The method of claim 6, wherein the rotating of the aging container is performed at a speed of about 500 RPM to 20,000 RPM.

11. The method of claim 10, wherein the rotating of the aging container is performed at a speed of about 2,000 RPM to 5,000 RPM for about 5 minutes to 15 minutes.

12. The method of claim 6, wherein the filtering, the aging, and the rotating are repeatedly performed at least two times.

13. Abrasive particles for a CMP slurry manufactured according to claim 1, and in which a ratio of a main peak to a side peak on an XRD graph is about 2 to 3.

* * * * *